United States Patent [19]

Morita et al.

[11] Patent Number: 4,741,561
[45] Date of Patent: May 3, 1988

[54] REMOTELY MONITORED SEAL IN A CONNECTION JOINT

[75] Inventors: Eiji Morita; Noritaka Hashimoto; Akira Wadamoto, all of Katsuta, Japan

[73] Assignee: Doryokuro Kakunenryo Kaihatsu Jigyodan, Tokyo, Japan

[21] Appl. No.: 704,889

[22] Filed: Feb. 25, 1985

[30] Foreign Application Priority Data

Mar. 2, 1984 [JP] Japan .................. 59-038847

[51] Int. Cl.⁴ ........................................... F16L 55/00
[52] U.S. Cl. ...................... 285/93; 285/106; 285/109; 285/420; 285/920; 285/351
[58] Field of Search ............... 285/1, 81, 91, 93, 96, 285/97, 106, 109, 365, 407, 408, 413, 420, 330, 920, 900, 351

[56] References Cited

U.S. PATENT DOCUMENTS

| 820,437 | 5/1906 | Pehrson | 285/351 |
|---|---|---|---|
| 3,023,995 | 3/1962 | Hopkins | 285/97 |
| 3,236,544 | 2/1966 | Brown | 285/97 |
| 3,552,777 | 1/1971 | Heinrich et al. | 285/81 |
| 3,884,511 | 5/1975 | Hermanson | 285/93 |
| 3,997,197 | 12/1976 | Marsh | 285/920 |
| 4,274,664 | 6/1981 | Thominet | 285/920 |
| 4,302,033 | 11/1981 | Evans et al. | 285/93 |
| 4,561,679 | 12/1985 | Choate | 285/106 |
| 4,569,540 | 2/1986 | Beson | 285/93 |

FOREIGN PATENT DOCUMENTS

| 511690 | 6/1952 | Belgium | 285/407 |
|---|---|---|---|
| 301066 | 10/1929 | United Kingdom | 285/97 |
| 759387 | 10/1956 | United Kingdom | 285/93 |
| 657216 | 4/1979 | U.S.S.R. | 285/351 |

Primary Examiner—Cornelius J. Husar
Assistant Examiner—Eric K. Nicholson
Attorney, Agent, or Firm—Browdy and Neimark

[57] ABSTRACT

A engageable joint having male pipe end and a female pipe end. The male and female pipe ends are removably engaged with gaskets. The gaskets are inflatable and arranged in a plurality of stages in the axial direction to inflatably seal a clearance between the pipe ends, and the joint has a clamp device for clamping the two pipe ends so that the pipe ends can be engaged and disengaged readily and reliably.

4 Claims, 1 Drawing Sheet

REMOTELY MONITORED SEAL IN A CONNECTION JOINT

FIELD OF THE INVENTION

The technique disclosed herein belongs to the technical field of a joint structure for fluid piping which is provided in nuclear power plant radioisotope facilities, spent fuel storing pool cells, or the like.

DESCRIPTION OF THE PRIOR ART

As is generally known, a various fluid piping is employed, for instance, in the nuclear reactor cavity in nuclear power plant radioisotope facilities or in spent fuel storing pool cells, etc. Since such piping is complex and must be installed within limited space, many joints are employed. These piping joints must be inspected and handled remotely. In the radioactive environment of a nuclear power plant, routine maintenance of joints, monitoring for leakage, inspection for earthquake damage, and reaction to thermal stress must all be performed remotely.

Conventional remotely-coupled joints are rigidly constructed with nuts and bolt or the like, while leakage monitoring is conducted regularly or irregularly and by direct or indirect visual inspections or the like. Consequently maintenance and inspection of joints in piping which has many bent portions and complicated structures as described above is a difficult and error-prone process when performed remotely. This has the disadvantage that joints may loosen and leak as a result of an earthquake. Moreover, leakage is monitored intermittently and sometimes indirectly; hence, leakage may not be detected until some time after it has begun.

It is evident that leakage is a serious problem in nuclear power plants in terms of both safety and economy. Moreover, the rigid inflexible structure of conventional joints is more likely to loosen and leak when subjected to earthquakes or thermal stress. An obvious consequence of this is that serious leakage may occur.

SUMMARY OF THE INVENTION

An object of the present invention is to provide an excellent remote connection joint which, solves the technical problems related to remote connection joints in nuclear power plant piping in the above-described prior art; enables easy connection of sections of piping so that remote inspection and handling can be performed easily and reliably, enables the enlargement of the clearance between pipe ends so that joints are less likely to be damaged by earthquakes or thermal stress, etc., enables the formation of a leakproof flexible seal so that leakage may be prevented completely, and enables constant monitoring, thus improving economy, reliability and safety to a degree that it can be beneficial in the fields of uses of nuclear power in the energy industry.

DETAILED DESCRIPTION OF THE PREFERRED EMBODIMENT

One embodiment of the present invention will be described hereunder with reference to drawings.

Figure 1:
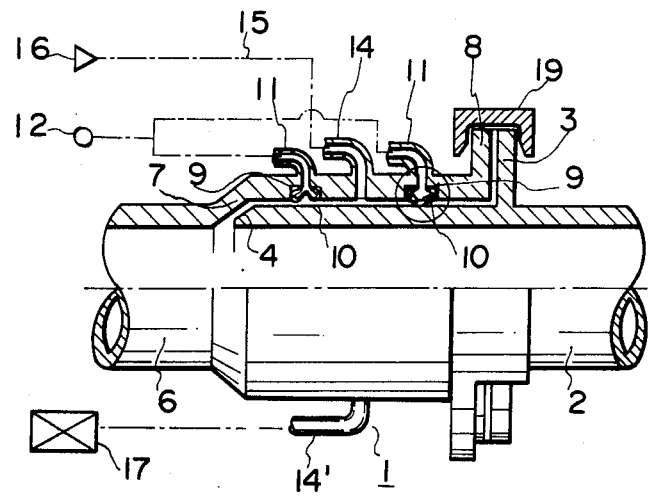
FIG. 1 shows a side view of a partial section of a fundamental embodiment.

FIG. 1 shows the fundamental mode of a joint 1 of the present invention which is employed for connecting sections of piping in spent fuel storing pool cells or the like in the radioisotope facilities of nuclear power plants. A male pipe end 2 constituting one part of said joint has a flange 3 formed monolithically at a prescribed position and a guide taper 4 formed at the tip, and is so designed that it requires virtually no maintenance or inspection.

Figures 2, 3:
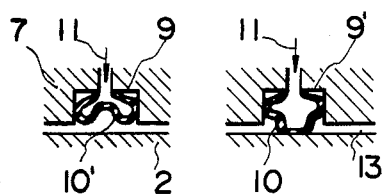
FIG. 2 shows a section of an inflatable gasket in the operating state.
FIG. 3 shows a section of said inflatable gasket in the state in which it is operating for pressure sealing.

A female pipe end 6 also has a guide taper 7 which is formed for receiving the guide taper 4 formed at the tip of said male pipe end 2. At the rear end of the female pipe end 6 a flange 8 contacting the flange 3 of said male pipe end 2 is formed monolithically in such a manner that it is extended laterally, and a pair of ring-shaped pockets 9 are formed inward at a prescribed interval between said flange 8 and guide taper 7. Inside these pockets inflatable gaskets 10 made of rubber are set, and these gaskets are connected to a compressed-air source 12 via air nozzles 11. As illustrated in FIGS. 2 and 3, the inflatable gaskets 10 are inflated by the compressed air supplied from said compressed-air source 12, respectively, and the compressed air seals the outer lateral surface of the male pipe end 2, while clearance 13 formed between the male pipe end 2 and the female pipe end 6 is maintained by the inflated gaskets 10.

A monitor nozzle 14 which opens in said clearance 13 and communicates therewith is provided between said ring-shaped pockets 9, and this nozzle 14 is connected to an inactive gas source 16 through a passage 15. Another monitor nozzle 14', which opens in said clearance 13 and is connected thereto on the opposite side to said monitor nozzle 14, is connected appropriately to a monitor-detector device 17.

Figure 4:
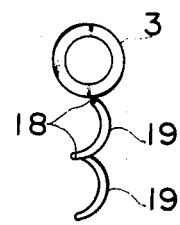
FIG. 4 shows a front view of a clamp jig connected to a flange.
Figure 5:
FIG. 5 shows a front view of the clamp jig for explaining the state in which said clamp jig clamps flanges.
Figure 6:
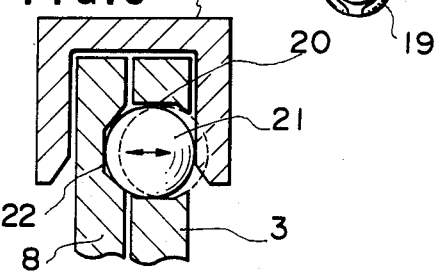
FIG. 6 shows a longitudinal section of the clamp jig for explaining the state in which it clamps the flanges.

A pair of semi-circular and circular-arc outer clips 19, each having a u-shaped section as shown in FIG. 6., which are connected to a part of the flange 3 of said male pipe end 2 by pins 18 as illustrated in FIGS. 4 and 5 and serve as a clamp device, are so devised as to clamp the flange 3 of the male pipe end 2 and the flange 8 of the female pipe end 6 together from outside across the outer peripheral portions thereof. Furthermore, while the relative movements in the axial direction of the flanges 3 and 8 are impossible, a ball coupling 21 fitted freely in a hole 20 having tapered or inclined portions at inlet portions and bottom portions is pushed into a tapered depression 22 formed on the base end side of the flange 8 of the female pipe end 6, as shown in FIG. 6, so that clips 19 as a clamping device prevent the male pipe end 2 and the female pipe end 7 from slipping off in the axial direction, and simultaneously the ball coupling 27 prevents the relative movements of the male and female pipe ends 2, 7 in the circumferential direction.

When a pair of piping sections are connected by remotely coupling the joint thereof in the above-described construction, the guide taper 4 formed at the tip of the male pipe end 2 is inserted easily into the guide taper 7 formed at the female pipe end 6 of the other piping, and the relative fitting of the two pipe ends is completed at the position at which the flanges 3 and 8 thereof come in contact with each other. Then, the outer clips 19 as the clamp device which are connected integrally to the flange 3 of the male pipe end 2 are put on the outer peripheral edges of said two flanges 3 and 8 by moving these clips around the pins 18, and thereby the ball coupling 21 fitted freely in the flange 3 is intruded into the tapered hole 22 of the other flange 8 to clamp the two flanges, so that the male pipe end 2 and the female pipe end 6 can not be drawn out and that the relative rotation thereof can be prevented. The dotted line shown in FIG. 6 is to show the free fitment of the ball coupling 21 in the tapered hole 22.

Then, a valve not shown in the figure being opened, compressed air is supplied from the compressed-air source 12 into the aforesaid inflatable gaskets 10 of the coupler through the air nozzles 11, so as to inflate said gaskets 10 with pressure on the outer lateral surface of the male pipe end 2 as shown in FIG. 3. Thereby the male pipe end 2 and the female pipe end 6 are sealed completely and flexibly even with the existence of the overlap clearance 13 between them.

Even when said clearance 13 is varied due to unexpected vibration such as that caused by an earthquake, such vibration is absorbed by said inflatable gaskets 10, so that the sealing property thereof is securely maintained, and thus the leakage of a fluid flowing through the pipings can be prevented without fail.

Even if one of the inflatable gaskets 10 should be damaged by an earthquake of greater magnitude than the design tolerance of the gasket under extreme thermal stress, the undamaged gasket backs up the damaged one maintaining thereby a leakproof seal.

Simultaneously, when air is supplied from the compressed-air source 12 into said inflatable gaskets 10, an inactive gas is supplied from the inactive gas source 16 to the monitor nozzle 14 through the passage 15 and then is supplied from the monitor nozzle 14' to the prescribed monitor-detector device 17. Therefore said inactive gas for monitoring fills up said clearance 13 between the inflatable gaskets 10. Accordingly, when one of said gaskets 10 is damaged unexpectedly, the pressure of the inactive gas for monitoring varies immediately, and the breakdown of that gasket can be detected. Thus, while the other inflatable gasket 10 backs up the damaged one and maintains the seal as described above, measures for restoration of the damaged gasket can be taken.

Figure 7:
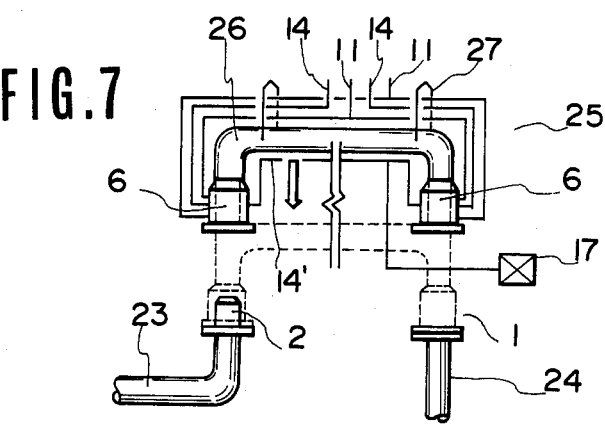
FIG. 7 shows a side view for concrete explanation.

Next, the remote coupling mode of a joint for a pair of sections of piping 23 and 24 in an actual plant will be described with reference to the embodiment shown in FIG. 7. The elements to be maintained and inspected are installed as described previously, so that aforesaid female pipe ends 6 are connected through the intermediary of section of piping 26 in a jumper section 25 set inside a remote cell and are made elevatable by means of lifting bails 27. At the same time, connection is made to the monitor-detector device 17 with a flexible joint or any other appropriate means, while monitor nozzles 11, 14 and 14' are connected to utility lines for inner-plant piping.

Then, the jumper section 25, suspended by said lifting bails 27, is lowered toward the male pipe ends 2 of pipings 23 and 24 for a radioactive fluid, the female pipe ends 6 are remotely installed on the male pipe ends 2 on the lower side as shown in the figure, and insertion and clamping with the outer clip 19 are performed as described previously with reference to FIG. 1. After the connection has been completed, compressed air is supplied to the inflatable gaskets 10 from the utility lines through the snap-fit connectors and the gasket nozzles 11 for pressure sealing, while compressed air is supplied to the monitor nozzles 14 and 14' from the utility lines and the leakage thereof is monitored by the monitor-detector device 17.

During the operation of the installation, the flexible structure of the joints of piping sections 23 and 24 maintains a constant seal in such a way that the earthquakes and thermal stress do not damage all of the inflatable gaskets 10, and if one of the gaskets 10 is damaged, this is immediately detected by the monitor-detector device 17 due to a change in pressure via the monitor nozzles 14, while the other inflatable gasket 10 which is not damaged performs the back-up operation so as to prevent the leakage to the outside. Thereafter an appropriate means of maintenance has been taken for the damaged gasket 10.

The male pipe end 2 is easily and smoothly inserted into the female pipe end 6 by the tapered guide 4 of the male pipe end 2 and the tapered guide 7 of the female pipe end 6. It is also facilitated by the presence of the set clearance 13 between the two pipe ends 2 and 6 as described above; hence, the joint can be easily and reliably coupled remotely.

The mode of embodiment of the present invention is not limited, of course, to those of the above-described embodiments; various modes can be adopted. For instance, not only can inert gas or compressed air be made to flow through between the gaskets in a plural stage in the clearance between the male and female pipe ends, but also water can be made to circulate there. Moreover, since the pressure of the inert gas for monitoring varies immediately after one of the paired gaskets 10 is damaged, the leakage can be detected by monitoring the pressure change of inert gas by using the air cylinder. Monitoring of radioactivity of circulated fluid is easily accomplished with the arrangement of the present invention. The gaskets are not limited to those in two stages as described above, but gaskets in a plurality of stages, i.e., three or more, can also be employed.

As stated above, according to the present invention, the remotely engageable joint for piping in spent fuel cells storing pool or the like in radioisotope facilities in nuclear power plants has a flexible structure. This structure is both flexible and durable to the extent that it maintains its seal despite earthquakes and thermal stress, so that leakage of radioactive material is prevented and the working life of the joint itself is greatly extended.

The gaskets such as the inflatable gaskets provided between the male and female pipe ends in said joint contribute directly to the flexibility of said structure, and this has the excellent effect that said gaskets can protect the structure of the joint from damage and also can constantly maintain the seal.

The arrangement of said gaskets in a plural stage in the axial direction of the male and female pipe ends produces the excellent effect that, even if one of the gaskets is damaged or if the material of one gasket deteriorates, the other gasket can back up the damaged one. The back-up functions of these gaskets are improved by their flexible structure.

Furthermore, the arrangement of inflatable gaskets which are applied in a plurality of stages in the axial direction in the clearance between the male and female pipe ends produces the excellent effect that those gaskets can continuously maintain the seal despite earthquakes and thermal stress. Continuous monitoring is assured; consequently, leakage can always be detected during operation, while such leakage is usually detected only after it has occurred, and this makes it possible to cope with the leakage immediately. This method therefore improves the safety of a nuclear power plant.

Thus, the joint of the present invention has a multiple effect in that it constantly maintains its function for the piping provided in cells or the like in nuclear power plants, so that the seal is also maintained constantly, and that monitoring is also maintained.

In addition, the provision of the clamp device of the ball coupling type or the like for the flanges provided at the male and female pipe ends produces the excellent effects that both of the flanges are prevented from slipping off in the axial direction and also from rotating in the circumferential direction by the ball clutch as the clamp device, that the joint once coupled performs its function invariably as described previously, while allowing relatively flexible movements, and that the joint connection of the two pipe ends can be performed smoothly and easily by remote operation by using the clamp device.

What is claimed is:

1. A pipe joint with a remotely monitorable seal for male and female pipe ends in which the male pipe end is inserted into and engaged in sealing relationship with the female pipe end, comprising:
    (a) at least two ring-shaped pockets; said ring-shaped pockets being formed at an interval on an inner surface of said female pipe end;
    (b) inflatable rubber gaskets having a first side and a second side in each of said pockets; said inflatable rubber gaskets being connected to an external compressed air-source so that said inflatable rubber gaskets are inflated by compressed air to thereby seal a clearance between said male pipe end and said female pipe end;
    (c) a first flange at an end portion of said female pipe end;
    (d) a second flange at said male pipe end; said second flange being engageable with said first flange when said male pipe end is inserted into said female pipe end;
    (e) clamp means connected to said second flange; said clamp means having a pair of arc-shaped clips in the form of a U-shaped cross-section so that said first flange and said second flange are enclosed by said clips unitarily to clamp said first flange and said second flange;
    (f) a first monitor nozzle disposed between said inflatable gaskets; said first monitor nozzle being connected to said clearance between said male pipe end and said female pipe end so that a monitoring fluid is fed to said clearance through said first monitor nozzle; and
    (g) a second monitor nozzle disposed between said inflatable gaskets relative to said first monitor nozzle; said second monitor nozzle being connected to said clearance at one end thereof and having a monitor detector, said monitor detector being connected to other end of said second monitor nozzle so that said monitor fluid flown into said clearance from said first monitor nozzle is fed to said monitor detector through said second monitor nozzle, whereby the sealing relationship of the joint for the male and female pipe ends can be remotely monitored.

2. A remotely controllable joint according to claim 1, wherein a tapered portion is formed at an end of said male pipe end for guiding said male pipe end into said female pipe end.

3. A remotely controllable joint according to claim 1, wherein said inflatable rubber gaskets are arranged in a plurality of stages axially to the male and female pipe ends.

4. A remotely controllable joint according to claim 1, wherein said clamp means has a ball coupling.

* * * * *